(12) United States Patent
Munetoh

(10) Patent No.: US 9,448,910 B2
(45) Date of Patent: Sep. 20, 2016

(54) COMPUTER-IMPLEMENTED METHOD, PROGRAM, AND TRACER NODE FOR OBTAINING TRACE DATA RELATING TO PARTICULAR VIRTUAL MACHINE

(71) Applicant: International Business Machines Corporation, Armonk, NY (US)

(72) Inventor: Seiji Munetoh, Tokyo (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 165 days.

(21) Appl. No.: 14/222,812

(22) Filed: Mar. 24, 2014

(65) Prior Publication Data

US 2014/0298334 A1  Oct. 2, 2014

(30) Foreign Application Priority Data

Mar. 29, 2013  (JP) ................. 2013-072211

(51) Int. Cl.
*G06F 11/34* (2006.01)
*G06F 9/48* (2006.01)
(Continued)

(52) U.S. Cl.
CPC ......... *G06F 11/3471* (2013.01); *G06F 9/4856* (2013.01); *G06F 11/301* (2013.01); *G06F 11/3037* (2013.01); *G06F 11/006* (2013.01); *G06F 11/3003* (2013.01);
(Continued)

(58) Field of Classification Search
None
See application file for complete search history.

(56) References Cited

U.S. PATENT DOCUMENTS 5,386,565 A * 1/1995 Tanaka et al. ...... G06F 11/3636
714/E11.2

(Continued)

FOREIGN PATENT DOCUMENTS

JP  05-035548 A  2/1993
JP  05-100903 A  4/1993
(Continued)

OTHER PUBLICATIONS

Adams et al. "A comparison of software and hardware techniques for x86 virtualization." ACM Sigplan Notices 41.11 (2006): pp. 2-13.*
(Continued)

*Primary Examiner* — Chameli Das
*Assistant Examiner* — Joanne Macasiano
(74) *Attorney, Agent, or Firm* — Cantor Colburn LLP; Mercedes Hobson

(57) ABSTRACT

An improved method for identifying trace data relating to a particular virtual machine from trace data acquired by a tracer node. The method is executed in a computing environment including at least one processing node and a tracer node for acquiring a trace of access to a memory apparatus thereof. The method includes the steps of: starting recording of trace data containing information of the trace of the access to the memory apparatus of the tracer node; storing, in response to migration of the particular virtual machine from a given processing node to the tracer node, information identifying a physical address of the memory apparatus of the tracer node, the physical address being assigned to the particular virtual machine; and identifying the trace data relating to the particular virtual machine from the trace data, using the assigned physical address of the memory apparatus of the tracer node.

20 Claims, 8 Drawing Sheets

(51) Int. Cl.
*G06F 11/30* (2006.01)
*G06F 11/00* (2006.01)

(52) U.S. Cl.
CPC ...... *G06F 11/3414* (2013.01); *G06F 11/3476* (2013.01); *G06F 2201/815* (2013.01)

(56) References Cited

U.S. PATENT DOCUMENTS

| | | | |
|---|---|---|---|
| 5,721,917 A * | 2/1998 | Elliott | G06F 11/3428 707/694 |
| 7,222,221 B1 * | 5/2007 | Agesen | G06F 9/45537 707/999.2 |
| 7,512,769 B1 * | 3/2009 | Lowell | G06F 9/461 711/165 |
| 9,086,981 B1 * | 7/2015 | Tati | G06F 12/10 |
| 2002/0156932 A1 * | 10/2002 | Schneiderman | G06F 9/4862 719/317 |
| 2006/0271809 A1 * | 11/2006 | Ichikawa | G06F 11/0793 714/2 |
| 2009/0144510 A1 * | 6/2009 | Wibling | G06F 9/5016 711/147 |
| 2010/0058358 A1 * | 3/2010 | Franke | G06F 12/1027 719/319 |
| 2014/0156910 A1 * | 6/2014 | Uttamchandani | G06F 3/061 711/103 |

FOREIGN PATENT DOCUMENTS

| | | |
|---|---|---|
| JP | 05-143391 A | 6/1993 |
| JP | 05-313947 A | 11/1993 |
| JP | 2009-176297 A | 8/2009 |
| JP | 2010-204934 A | 9/2010 |
| JP | 2011-028547 A | 2/2011 |

OTHER PUBLICATIONS

Agesen et al. "The evolution of an x86 virtual machine monitor." ACM SIGOPS Operating Systems Review 44.4 (2010): pp. 3-18.*

* cited by examiner

| Time | GVA | GPA | PID | Name |
|---|---|---|---|---|
| ⋮ | ⋮ | ⋮ | ⋮ | ⋮ |
| 00:03:003000 | 006d3000 | 02043000 | 1240 | /usr/bin/java |
| ⋮ | ⋮ | ⋮ | ⋮ | ⋮ |

FIG. 8

| Time | Address HVA | HPA | PID | Name |
|---|---|---|---|---|
| ⋮ | ⋮ | ⋮ | ⋮ | ⋮ |
| 01:11:003000 | 23673000 | 001F3000 | 245 | /usr/libexec/qemu-kvm |
| ⋮ | ⋮ | ⋮ | ⋮ | ⋮ |

FIG. 9

| Time | Command | Address HPA | HVA/GPA | GVA | PID | Process Name |
|---|---|---|---|---|---|---|
| ⋮ | ⋮ | ⋮ | ⋮ | ⋮ | ⋮ | ⋮ |
| 01:12:000010 | Read | 001F3400 | 23673400/02043400 | 006d3400 | 1240 | /usr/bin/java |
| 01:12:000014 | Read | 001F3440 | 23673440/02043440 | 006d3440 | 1240 | /usr/bin/java |
| ⋮ | ⋮ | ⋮ | ⋮ | ⋮ | ⋮ | ⋮ |

FIG. 10

COMPUTER-IMPLEMENTED METHOD, PROGRAM, AND TRACER NODE FOR OBTAINING TRACE DATA RELATING TO PARTICULAR VIRTUAL MACHINE

CROSS-REFERENCE TO RELATED APPLICATION

This application claims priority under 35 U.S.C. §119 from Japanese Patent Application No. 2013-072211 filed Mar. 29, 2013, the entire contents of which are incorporated herein by reference.

BACKGROUND OF THE INVENTION

The present invention relates to memory management. More specifically, the present invention relates to a method, program, and tracer node for identifying trace data related to a particular virtual machine from trace data that is a history of access to a memory apparatus of a computer.

There exist tracers that can acquire a trace of access to a memory apparatus of a computer. The tracer can be realized by, for example, using special monitoring hardware. Trace data obtained by such a tracer can be used for various purposes. For example, if memory access patterns of various workloads are analyzed, an improved memory controller can be designed so as to achieve an increase in speed, parallelization, a reduction in consumed power, and the like of memory access. Further, if conditions of memory usage are analyzed for software and various workloads running on a server using new memory technology of a flash memory, an MRAM, a PCM, and the like, principles and hints for memory device selection and architecture decision for the server and the software can be obtained.

SUMMARY OF THE INVENTION

Accordingly, one aspect of the present invention is a computer-implemented method for identifying trace data related to a particular virtual machine from trace data acquired by a tracer node, wherein the computer includes at least one processing node and a tracer node for acquiring a trace of access to a memory apparatus thereof, the method including the steps of: starting recording of trace data containing information of the trace of the access to the memory apparatus of the tracer node; storing, in response to migration of the particular virtual machine from a given processing node to the tracer node, information identifying a physical address of the memory apparatus of the tracer node, the physical address being assigned to the particular virtual machine; and identifying the trace data relating to the particular virtual machine from the trace data, using the assigned physical address of the memory apparatus of the tracer node.

Another aspect of the present invention is a non-transitory computer readable storage medium tangibly embodying a computer readable program code having computer readable instructions which, when implemented, cause a computer device to carry out the steps of a method for identifying trace data related to a particular virtual machine from trace data acquired by a tracer node, the method including: starting recording of trace data containing information of the trace of the access to the memory apparatus of the tracer node; storing, in response to migration of the particular virtual machine from a given processing node to the tracer node, information identifying a physical address of the memory apparatus of the tracer node, the physical address being assigned to the particular virtual machine; and identifying the trace data relating to the particular virtual machine from the trace data, using the assigned physical address of the memory apparatus of the tracer node.

Another aspect of the present invention is a tracer node system for identifying trace data related to a particular virtual machine from trace data acquired by a tracer node, the tracer node system including: a memory; a processor communicatively coupled to the memory; and a tracer node module communicatively coupled to the memory and the processor, wherein the tracer node module is configured to perform the steps of a method including: starting recording of trace data containing information of the trace of the access to the memory apparatus of the tracer node; storing, in response to migration of the particular virtual machine from a given processing node to the tracer node, information identifying a physical address of the memory apparatus of the tracer node, the physical address being assigned to the particular virtual machine; and identifying the trace data relating to the particular virtual machine from the trace data, using the assigned physical address of the memory apparatus of the tracer node.

BRIEF DESCRIPTION OF THE DRAWINGS

FIG. 8 is a schematic diagram expressing an example of a page fault log in a VM level in the IaaS environment according to an embodiment of the present invention.

FIG. 9 is a schematic diagram expressing an example of a page fault log in a VMM level in the IaaS environment according to an embodiment of the present invention.

FIG. 10 is a schematic diagram expressing an example of trace data to which a GVA and a GPA/HVA are added in the IaaS environment according to an embodiment of the present invention.

DETAILED DESCRIPTION OF THE PREFERRED EMBODIMENT

Figure 1:
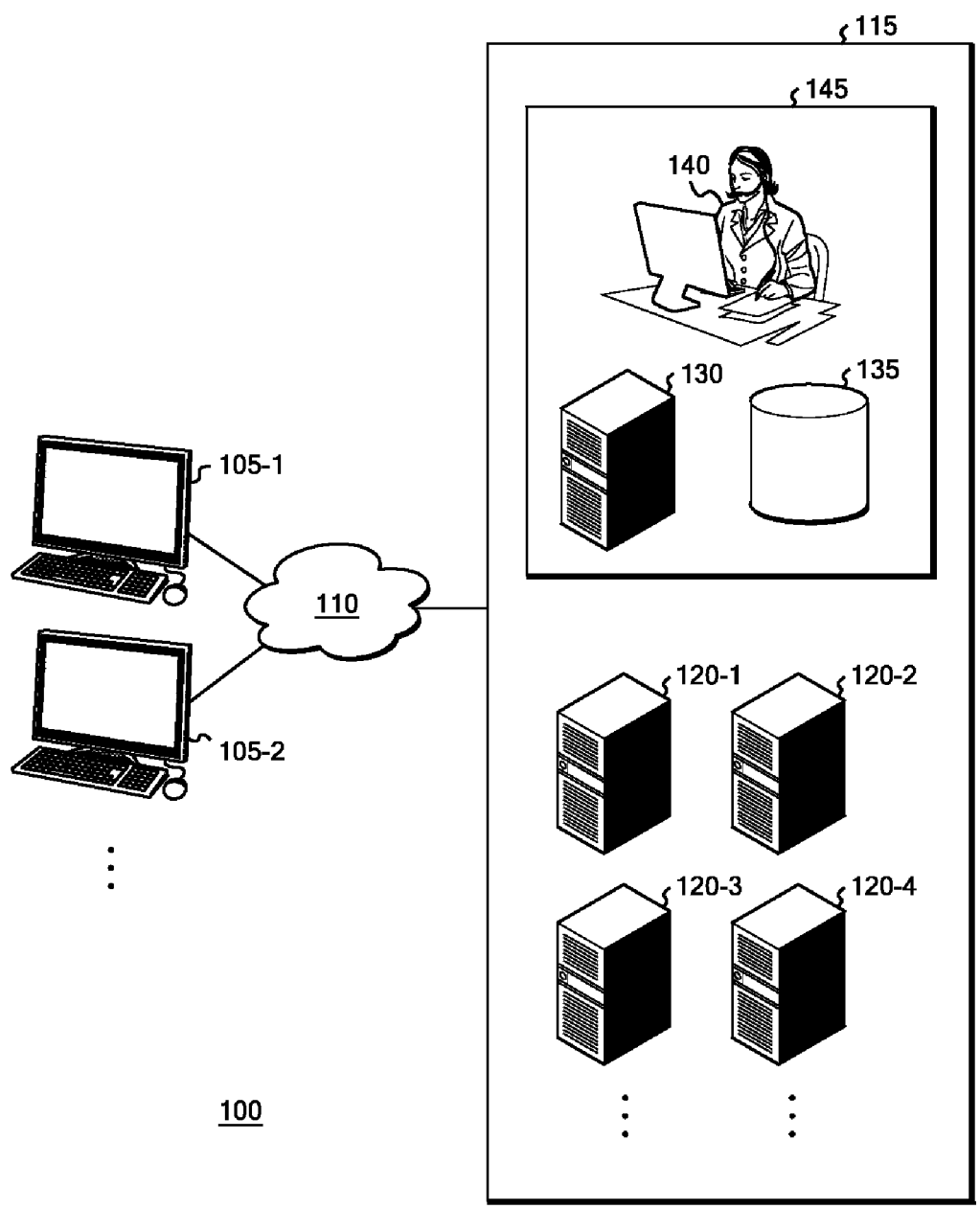
FIG. 1 is an overall diagram for describing the outline of an IaaS environment according to an embodiment of the present invention.

Infrastructure-as-a-Service (IaaS) exists as one mode of cloud computing that has become popular in recent years. In general, in an IaaS environment, a virtual machine (VM) is running on each of a large number of physical servers and each application program is executed on the VM. A user uses a VM assigned to him/her via a network. In the IaaS environment, in order to realize a trace of access to a memory apparatus for a particular VM and/or a particular application program, additional costs are necessary to, for example, provide special monitoring hardware to each processing server, introduce the VM and the application in a tracer node, and make settings for the trace.

Accordingly, the present invention provides an improved computer-implemented method, an improved program, and an improved tracer node, realized at relatively low costs and are for identifying trace data related to a particular virtual machine from trace data acquired by the tracer node in an IaaS environment.

Provided is a computer-implemented method for identifying, in a computing environment including at least one processing node and a tracer node for acquiring a trace of access to a memory apparatus thereof, trace data relating to a particular virtual machine from trace data acquired by the tracer node. The method includes the steps of: starting recording of trace data containing information of the trace of the access to the memory apparatus of the tracer node; storing, in response to migration of the particular virtual machine from a given processing node to the tracer node, information identifying a physical address of the memory apparatus of the tracer node, the physical address being assigned to the particular virtual machine; and identifying the trace data relating to the particular virtual machine from the trace data, using the assigned physical address of the memory apparatus of the tracer node.

Preferably, the at least one processing node and the tracer node each include a hypervisor capable of managing at least one virtual machine. More preferably, the virtual machine executes a first address translation between a guest virtual address and a guest physical address. More preferably, the information identifying the physical address of the memory apparatus of the tracer node is a host physical address and the hypervisor executes a second address translation between a host virtual address and a host physical address. More preferably, the host virtual address and the guest physical address are equivalent to each other. The step of storing can include a step of storing a host physical address that is assigned to the particular virtual machine in response to a page fault that occurs due to the second translation.

Preferably, the step of storing includes a step of storing a host physical address that is assigned to the particular virtual machine in response to a page fault that occurs due to the second translation. More preferably, the above-mentioned method further includes a step of starting memory copy in response to the migration, and the page fault due to the second translation occurs for every host virtual address that is used for the memory copy by the particular virtual machine.

Preferably, the trace data contains access time associated with each access to the memory apparatus, the step of storing includes a step of storing, into a page fault log, a correspondence between the host virtual address and the host physical address and occurrence time of the page fault due to the second translation, and the step of identifying includes a step of adding, to each memory access in the trace data, information of the host virtual address that is assigned to the particular virtual machine at the access time, with reference to the page fault log. More preferably, the step of identifying includes identifying the trace data relating to the particular virtual machine from the trace data, on a basis of the added information of the host virtual address.

Preferably, the above-mentioned method further includes a step of identifying, as a trace target, an application program product running on the particular virtual machine, and the step of storing includes a step of storing a guest physical address that is assigned to the application program product identified as the trace target, in response to a page fault that occurs due to the first translation.

Preferably, the step of storing includes a step of storing, into a page fault log, a correspondence between the host virtual address and the host physical address and occurrence time of the page fault due to the first translation, and the step of identifying includes a step of adding, to each memory access in the trace data, information of the guest virtual address that is assigned to the application program product identified as the trace target at the access time, with reference to the page fault log. More preferably, the step of identifying includes identifying trace data relating to the application program product identified as the trace target from the trace data, on a basis of the added information of the guest virtual address.

Hereinabove, the summary of the present invention is described by way of the computer-implemented method for obtaining the trace data relating to the particular virtual machine, but the present invention can also be interpreted as a program, a program product, software, a software product, a tracer node, a system, an apparatus, and the like.

The program product or the software product can include, for example, a storage medium in which the above-mentioned program or software is stored, and can include a medium that transmits the program or software. The program can cause a computer to execute each of the steps included in the above-mentioned method.

Note that necessary features of the present invention are not completely listed in the above-mentioned summary of the present invention and a combination or subcombination of these components can also be covered by the present invention.

Hereinafter, an embodiment of the present invention is described in detail with reference to the drawings. Note that the following embodiment does not limit the invention described in the Scope of Claims and that all combinations of features described in this embodiment are not necessarily essential to solutions provided by the present invention.

Further, the present invention can be carried out in many different modes and an interpretation thereof is not limited to the contents described in this embodiment. Throughout this entire description of an embodiment of the present invention, the same reference numbers are given to the same elements.

In a scenario of this embodiment of the present invention, in an IaaS environment including a large number of nodes on each of which a virtual machine (VM) is running, data (herein, can be referred to as "trace data") is identified, the data containing information of a trace of access to a memory apparatus by a particular VM and/or a particular application program running on a VM. Note that in this embodiment of the present invention, the "access" to the memory apparatus includes all operations (including READ and WRITE) on the memory.

In each node in the IaaS environment of this embodiment of the present invention, a virtual machine manager (VMM) is running on hardware including a CPU and a memory apparatus. In general, the VMM is software or firmware that can virtualize and manage a system resource as a VM. The VMM can be referred to as hypervisor. Further, because the VM operates on the VMM on the premise of the existence of the VMM, in general, the VMM can be referred to as host, and the VM can be referred to as guest.

The IaaS environment of this embodiment of the present invention includes: a small number of tracer nodes that can acquire a trace of access to its memory apparatus; and a large number of processing nodes not including such a function. Each tracer node of this embodiment of the present invention has a function of continuously recording every access to its memory apparatus (specifically, a main memory that is a DRAM), as trace data. Note that raw trace data acquired by the tracer of this embodiment of the present invention contains access time, a command, a physical address of an accessed region, a process ID, and a process name concerning access to the memory apparatus, all of which are not necessarily essential.

In each node in the IaaS environment of this embodiment of the present invention, in the case where an application program running on a given VM performs an operation on a memory apparatus, first, the given VM executes first address translation between: a guest virtual address (GVA) that is a virtual address in the VM level; and a guest physical address (GPA) that is a physical address in the VM level. Further, a VMM executes second address translation between: a host virtual address (HVA) that is a virtual address in the VMM level; and a host physical address (HPA) that is a physical address in the VMM level. Note that, in this embodiment of the present invention, the GPA and the HVA are equivalent to each other and, thus, are expressed as GPA/HVA. Further, in this embodiment of the present invention, the HPA is a physical address of the memory apparatus in the node.

In a scenario of this embodiment of the present invention, in response to specifying of a VM running on a processing node as a trace target, live migration of the VM to a tracer node is executed. Here, the live migration means that a VM running on a given server is migrated to another server without being stopped while the identity of the VM is held.

In this embodiment of the present invention, in response to live migration of a VM, in order for a tracer node to copy the contents of a memory that is used by the VM on a server before the migration to a server after the migration, a VMM on a migration-origin processing node and a migration-destination tracer node exchange data with each other. At this time, writing into a memory apparatus of the tracer node is tried with a HVA of the tracer node being specified, but a HPA corresponding to the HVA is yet to be decided, so that a page fault occurs. In this embodiment of the present invention, a page fault (PF) log in the VMM level is formed, the PF log including information of: a correspondence between a HPA assigned in response to the page fault and a HVA; and the assignment time.

In this embodiment of the present invention, because a VMM can control memory copy and can identify the start and end of the memory copy, a page fault that occurs for a live-migrated VM from the start of the memory copy to the end thereof can be identified. With the use of such information of a correspondence between a HPA and a HVA and the assignment time that is included in a PF log in the VMM level, only trace data relating to a particular VM can be identified from trace data in which access is recorded in association with a HPA of a memory apparatus of a tracer node. Further, the PF log is updated even when the VM is running on the tracer node and information of a PF concerning memory access by the trace target VM is acquired.

In this embodiment of the present invention, an application program running on a VM tries memory access, with the result that a page fault can occur. In this embodiment of the present invention, a page fault (PF) log in the VM level is formed, the PF log including information of: a correspondence between a GPA assigned in response to the page fault and a GVA; and the assignment time. Then, with the use of the PF log in the VMM level and the PF log in the VM level, trace data relating to a particular application program can be identified from trace data in which access is recorded in association with a HPA of a memory apparatus of a tracer node.

Therefore, according to this embodiment of the present invention, with the effective utilization of the small number of tracer nodes, trace data relating to a particular VM and/or a particular application can be identified and analyzed. As a result, at the time of designing an operating system of the particular VM and/or the particular application, the trace data can be utilized for improvement in memory usage and the like.

Hereinafter, the present invention is described in detail with reference to FIGS. 1 to 10. FIG. 1 is an overall diagram for describing the outline of an IaaS environment according to an embodiment of the present invention. An IaaS environment 100 according to an embodiment of the present invention includes clients 105-1, 105-2, . . . (hereinafter, can be collectively referred to as "clients 105") and a data center 115. The clients 105 and the data center 115 can communicate with each other via a network 110 according to a well-known communication protocol such as TCP/IP. The network 110 is typically the Internet.

The data center 115 of this embodiment of the present invention includes a large number of processing nodes 120-1, 120-2, . . . (hereinafter, can be collectively referred to as "processing nodes 120") that execute processing for providing virtualized computing resources to the clients. In each processing node 120, a VMM is running on its hardware.

In this embodiment of the present invention, a VM assigned to each client 105 is running on the VMM in each processing node 120. The client 105 uses, as its IT infrastructure, a VM service running on any of the processing nodes 120 in the data center 115, via the network 110. Meanwhile, a user of the client 105 is not aware of on which processing node the VM service in use is running. In general, such an environment that provides an IT infrastructure as its service is referred to as IaaS environment, which is one mode of cloud computing technology.

In the IaaS environment of this embodiment of the present invention, a VM running on a given node can be migrated to another node without being stopped while the identity of the VM is held. This is referred to as live migration of the VM. Note that, even in the case where the live migration is executed, the client 105 is not aware of that fact and it can continuously receive the VM service. The live migration of the VM is a technique that has already been well known and, hence, further description thereof is not given here.

The data center 115 of this embodiment of the present invention includes a tracer system 145 for acquiring and analyzing a trace of access to a memory apparatus by a particular VM and/or a particular application program. The tracer system 145 of this embodiment of the present invention includes a tracer node 130, a trace data storing apparatus 135, and an administrator terminal 140. Similar to the processing nodes 120, the tracer node 130 is a node in the IaaS environment, the node including a single VMM and at least one VM that can be executed on the VMM. VMs can be live-migrated between the processing nodes 120 and the tracer node 130.

Moreover, the tracer node 130 of this embodiment of the present invention has a function of recording, as trace data, every access to its memory apparatus (specifically, a main memory that is a DRAM) into the trace data storing apparatus 135. In this embodiment of the present invention, such a function is implemented by special monitoring hardware. The number of the tracer nodes 130 installed in the data center 115 is small (in this embodiment of the present invention, only one), due to the costs required for the implementation of such special monitoring hardware.

In this embodiment of the present invention, the trace data obtained by the tracer node 130 is first recorded into a built-in hard disk (HDD) and/or a built-in solid state drive (SSD). Then, the trace data is migrated to the trace data storing apparatus 135 according to a predetermined technique. The administrator terminal 140 of this embodiment of the present invention has a function of specifying a trace target VM and/or a trace target application program. The administrator terminal 140 further has a function of analyzing the trace data.

Figure 2:
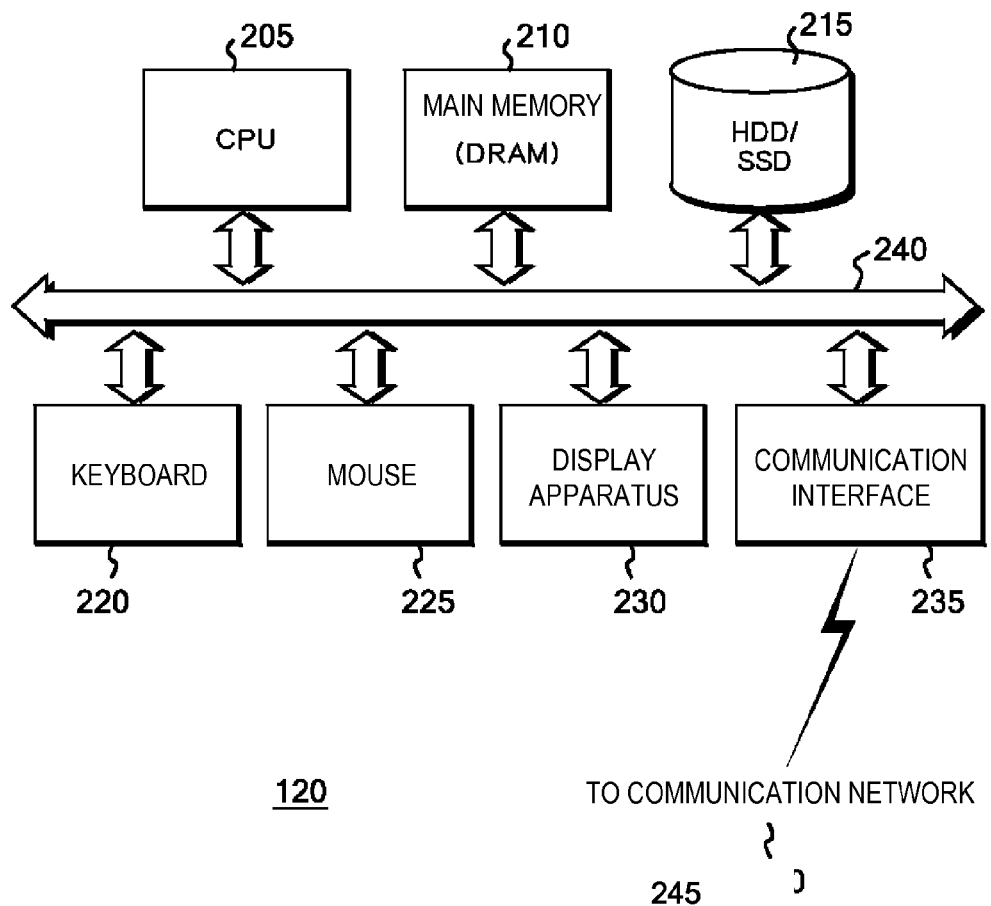
FIG. 2 is a hardware configuration diagram of a computer apparatus that can be used to realize a processing server included in the IaaS environment according to an embodiment of the present invention.

FIG. 2 is a hardware configuration diagram of the processing node 120 constituting the IaaS environment according to an embodiment of the present invention. The processing node 120 includes a central processing unit (CPU) 205 and a main memory (in this embodiment of the present invention, a DRAM) 215 that are connected to a bus 240. An information processing apparatus suitable to realize the processing node 120 includes a hard disk drive (HDD)/solid state drive (SSD) 215 that is a non-volatile storing apparatus. The HDD/SSD 210 can record therein codes of a computer program for giving a command to the CPU and the like in cooperation with the operating system to carry out the present invention. The computer program is loaded onto the main memory 210 to be thereby executed. The computer program can be compressed or divided into a plurality of parts to be recorded into a plurality of HDD/SSD apparatuses.

The processing node 120 of an embodiment of the present invention includes a keyboard 220 and a mouse 225 and receives an input from a local operator as needed. Moreover, the processing node 120 can be connected via a display apparatus 230 for presenting visual data to the local operator. The processing node 120 of an embodiment of the present invention can be connected to a network 245 via a communication interface 235 (for example, Ethernet®) to thereby communicate with other computers and the like. Although not illustrated, the processing node 120 can be connected to a printer via a parallel port and can also be connected to a modem via a serial port.

From the above description, it is easily understood that the information processing apparatus suitable to realize the processing node 120 of this embodiment of the present invention is realized by an information processing apparatus, such as a normal personal computer, workstation, server, or mainframe or a combination thereof. Note that these components are given as an example and all the components are not necessarily essential to the present invention.

Each hardware component of the information processing apparatus that is used as the processing node 120 in this embodiment of the present invention can be implemented by combining a plurality of machines, dividing the function of the processing node 120, and providing each machine with each divided function. As a matter of course, various changes of this type can be easily conceived by a person skilled in the art. Naturally, such changes are concepts encompassed in an idea of the present invention.

The VMM is running on the processing node 120 of this embodiment of the present invention. The VMM of this embodiment of the present invention includes z/VM® provided by International Business Machines Corporation, Kernel-based Virtual Machine (KVM) of a Linux® operating system, and ESX and ESXi provided by VMware, Inc., but is not limited thereto. Note that adoption of VMMs of any type in each processing node 120 is a concept encompassed in an idea of the present invention.

Further, the operating system (OS) of each VM managed by the VMM includes Windows® operating systems provided by Microsoft Corporation, Mac OSs® provided by Apple Inc., for example, AIX® provided by International Business Machines Corporation, and UNIX®-like systems such as Linux®, but is not limited thereto. Note that OSs of any type can be adopted as the OS of the VM managed by the VMM of the processing node 120 and all the OSs are concepts encompassed in an idea of the present invention.

From the above description, a person skilled in the art is able to easily understand that, in the processing node 120 used in this embodiment of the present invention, both the VMM running thereon and the VM further running on the VMM are not limited by a particular operating system environment.

Figure 3:
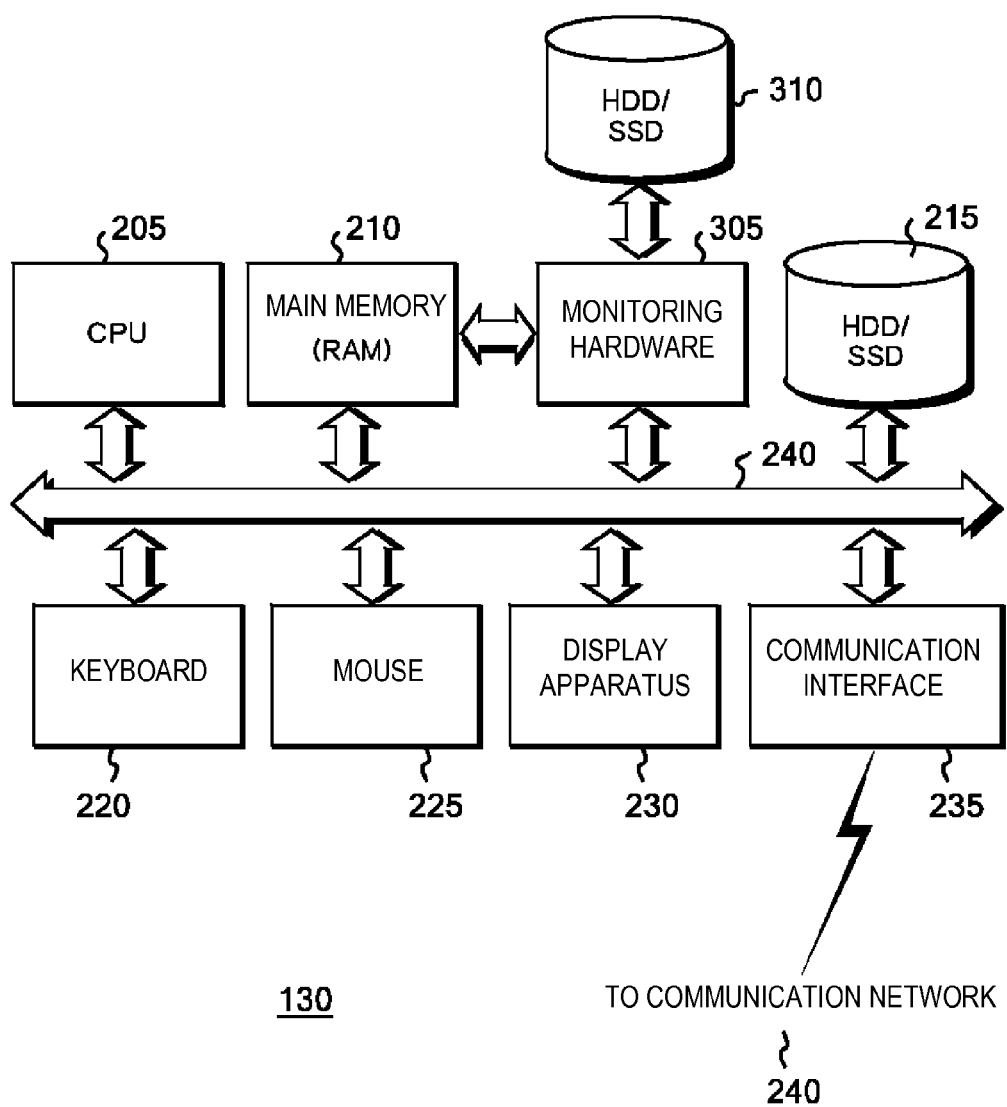
FIG. 3 is a hardware configuration diagram of a computer apparatus that can be used to realize a tracer node included in the IaaS environment according to an embodiment of the present invention.

FIG. 3 is a hardware configuration diagram of the tracer node 130 constituting the IaaS environment according to an embodiment of the present invention. FIG. 3 is substantially similar to the hardware configuration of the processing node 120 illustrated in FIG. 2, but note that special monitoring hardware 305 and a second SSD/HDD 310 are added. The monitoring hardware 305 of this embodiment of the present invention captures access (including all memory operations) to the main memory (RAM) 210 by a VM/application program running on the tracer node 130 and records, as trace data, the captured access into the second HDD/SSD 310. Note that the trace data recorded in the second HDD/SSD 310 is migrated to the trace data storing apparatus 135 according to a predetermined technique. The trace data storing apparatus 135 of this embodiment of the present invention can be realized by using an arbitrary technique of a cloud storage service that enables storage on the network to be treated as if the storage were a local storage. Further, the migration to the trace data storing apparatus 135 can be realized by, for example, the following techniques, but is not limited thereto. 1) The second HDD/SSD 310 is physically detached from the tracer node 130 and is attached to a server (not illustrated) for taking in the trace data, and the trace data is migrated to the trace data storing apparatus 135 via this server. 2) The trace data is sent out to a dedicated interface (not illustrated), such as a serial advanced technology attachment (SATA) via the monitoring hardware 305, and the trace data is stored into the trace data storing apparatus 135 via the tracer node 120 or another server (not illustrated).

Further, note that, in the tracer node 130 used in this embodiment of the present invention, both the VMM and the VM running on the VMM are not limited by a particular operating system environment, similarly to the processing node 120.

Figure 4:
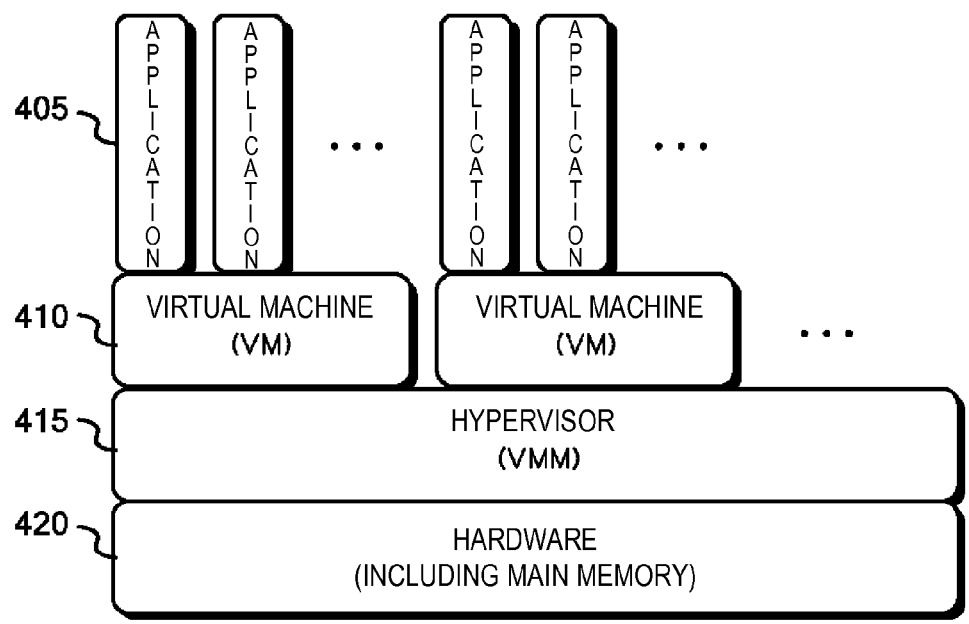
FIG. 4 is a diagram for describing an example of a hierarchical structure of the processing node or the tracer node in the IaaS environment according to an embodiment of the present invention.

FIG. 4 illustrates a hierarchical structure of the processing node 120 or the tracer node 130 in the IaaS environment according to this embodiment of the present invention. In the processing node 120 or the tracer node 130 of the present invention, in principle, a single VMM 415 is running in a level above hardware 420 including the main memory described with reference to FIG. 2 or FIG. 3, respectively. Moreover, at least one VM 410 can run in a level above the VMM 415. Moreover, at least one application program 405 is running in a level above each VM 410. Note that, as has already been described above, because the VM operates on the VMM on the premise of the existence of the VMM, the VMM can be referred to as host, and the VM can be referred to as guest.

In this embodiment of the present invention, the VMM 415 is not migrated from a particular node, whereas the VM 410 can be migrated from a given node to another node. In this embodiment of the present invention, in the case where the VM 410 is migrated, the application program group 405 running on the VM 410 is also migrated accordingly. In this embodiment of the present invention, a migration target VM (and an application program running thereon) can be migrated without being stopped. In general, such a technique of migrating a running VM between servers is referred to as live migration. Such a technique has already been well known and, hence, further description thereof is not given here.

In this embodiment of the present invention, the VM 410 is regarded by the client 105 as if the VM 410 were a single independent computer apparatus. The user of the client 105 can operate an application on the VM 410 assigned to him/her and use the IT infrastructure without being aware of on which processing node the VM 410 assigned to him/her is running.

In this embodiment of the present invention, when the application program running on the VM tries memory access with a virtual address of the main memory being specified, first, the VM translates the GVA into a GPA and delivers the GPA to the VMM. Subsequently, the VMM translates a HVA corresponding to the GPA into a HPA, whereby physical access to the memory apparatus is realized. This mechanism is described more in detail with reference to FIG. 5.

Figure 5:
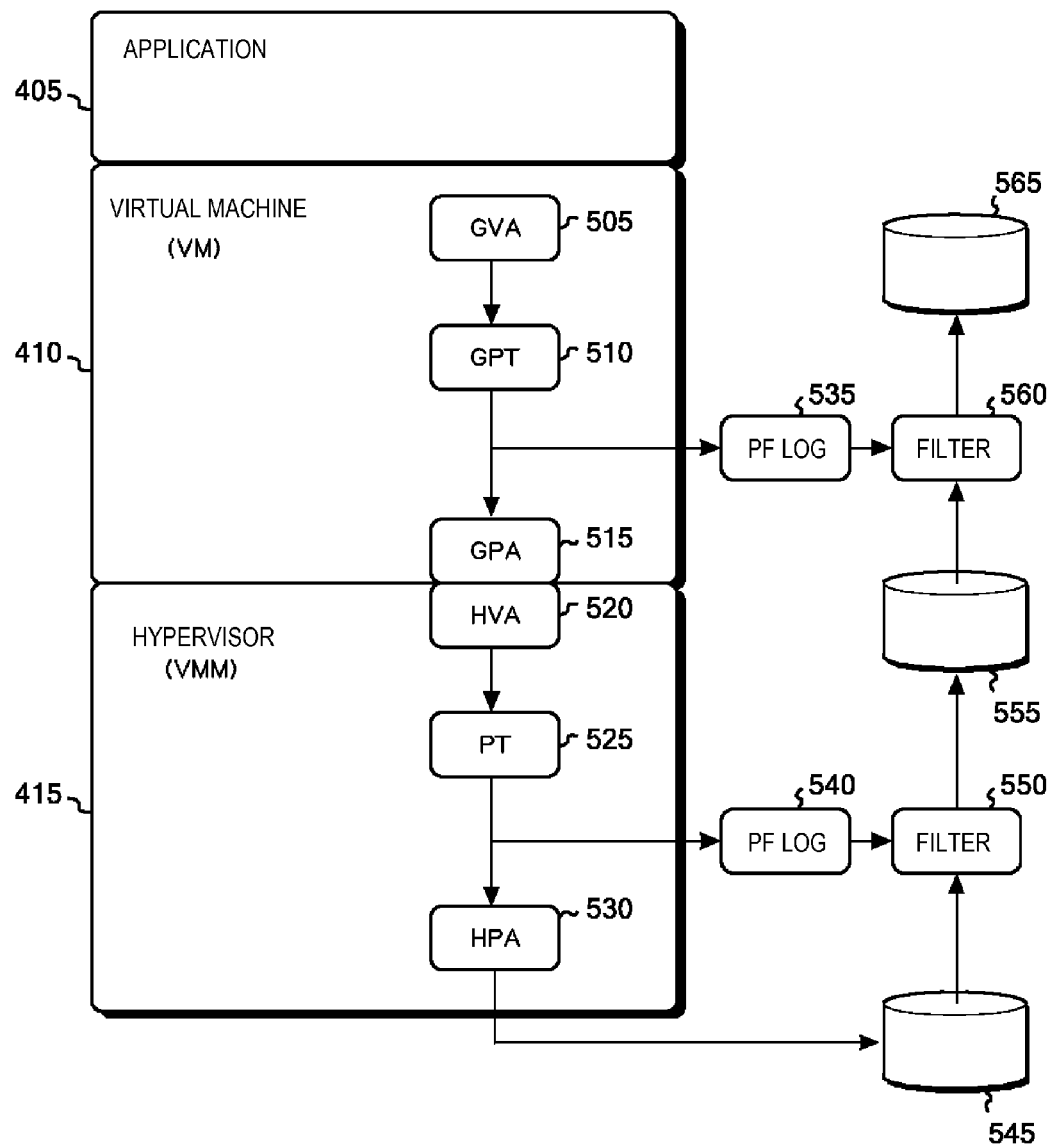
FIG. 5 is a diagram for describing address translation and acquisition of a trace of memory access in the tracer node in the IaaS environment according to an embodiment of the present invention.

FIG. 5 is a diagram for describing address translation and acquisition of a trace of memory access in the tracer node 130 in the IaaS environment according to this embodiment of the present invention. For the sake of convenience, abbreviated terms in FIG. 5 are first described below although some of the terms have already been described above:

GVA 505: guest virtual address
GPT 510: guest page table
GPA 515: guest physical address
HVA 520: host virtual address
PT 525: page table
HPA 530: host physical address
PF logs 535, 540: page fault logs In this embodiment of the present invention, the application program 405 executes a memory access command with the GVA 505 being specified. The GPT 510 stores therein the latest correspondence between the GVA 505 and the GPA 515 at that time. Upon reception of the memory access command from the application 405, the VM 410 translates the GVA 505 into the GPA 515 with reference to the GPT 510 and delivers the memory access command including the GPA 515 to the VMM 415. At this time, in the case where it is found that the GPA 515 corresponding to the GVA 505 included in the memory access command does not exist in the GPT 510, a page fault (PF) in the VM level occurs. In this embodiment of the present invention, the GPA 515 is newly assigned in response to the occurrence of such a PF in the VM level. In this embodiment of the present invention, moreover, the PF in the VM level is recorded into the PF log 535 in the VM level.

FIG. 8 is a schematic diagram expressing an example of the page fault log 535 in the VM level in the IaaS environment according to this embodiment of the present invention. The PF log 535 in the VM level of this embodiment of the present invention includes, for each PF in the VM level, the occurrence time of each PF, a GVA included in a memory access command, an assigned GPA corresponding to the GVA, a process ID (PID), and a process name (Name). Note that in this embodiment of the present invention, if the PF log 535 in the VM level is referred to with regard to an arbitrary GPA, it is possible to know the correspondence between the GVA and the GPA in a period between the PF occurrence time and next updating.

Upon reception of the memory access command including the GPA 515 from the VM 410, the VMM 415 of this embodiment of the present invention translates the HVA 520 (equivalent to the GPA 515) into the HPA 530 with reference to the PT 525, and accesses the memory apparatus of the tracer node 130. Similarly to the VM level, also in the VMM level, in the case where it is found that the HPA 530 corresponding to the HVA 520 included in the memory access command does not exist in the PT 525, a PF in the VMM level occurs. In this embodiment of the present invention, the HPA 530 is newly assigned in response to the occurrence of such a PF in the VMM level. In this embodiment of the present invention, moreover, the PF in the VMM level is recorded into the PF log 540 in the VMM level.

FIG. 9 is a schematic diagram expressing an example of the page fault log 540 in the VMM level in the IaaS environment according to this embodiment of the present invention. The PF log 540 in the VMM level of this embodiment of the present invention includes, for each PF in the VMM level, the occurrence time of each PF, a HVA included in a memory access command, an assigned HPA corresponding to the HVA, a process ID (PID), and a process name (Name). Note that, in this embodiment of the present invention, if the PF log 540 in the VMM level is referred to with regard to an arbitrary HPA, it is possible to know the correspondence between the HVA and the HPA in a period between the PF occurrence time and next updating.

In the tracer node 130 of this embodiment of the present invention, access to the memory apparatus by the VMM 415 using the HPA is captured by the special monitoring hardware (not illustrated in FIG. 5), and raw trace data 545 thus captured is recorded. As has already been described above, raw trace data acquired by the tracer of this embodiment of the present invention contains access time, a command, a physical address of an accessed region, a process ID, and a process name concerning access to the memory apparatus, all of which are not necessarily essential.

In this embodiment of the present invention, the monitoring hardware can monitor a physical address of the memory corresponding to access in the hardware level, but cannot directly monitor information in a level above the hardware level, for example, which virtual machine accesses the memory or which application accesses the memory. Accordingly, note that, even if the raw trace data 545 is directly referred to, it is difficult to analyze memory access of a particular VM/application program.

In this embodiment of the present invention, as has already been described above, if the PF log 540 in the VMM level is referred to, it is possible to know the correspondence between the HVA and the HPA in a period between the occurrence time of a given PF and next updating. Hence, in this embodiment of the present invention, a filter 550 adds, to each memory access recorded in the raw trace data, information of the HVA/GPA corresponding to the HPA at the access time with reference to the PF log 540 in the VMM level, and forms trace data 555 to which the HVA/GPA is added.

Further, in this embodiment of the present invention, as has already been described above, if the PF log 535 in the VM level is referred to, it is possible to know the correspondence between the GVA and the GPA in a period between the occurrence time of a given PF and next updating. Hence, in this embodiment of the present invention, a filter 560 adds, to each memory access recorded in the trace data 555, information of the GVA corresponding to the HVA/GPA at the access time with reference to the PF log 535 in the VMM level, and forms trace data 565 to which the GVA is added.

FIG. 10 is a schematic diagram expressing an example of the trace data 565 to which the GVA and the GPA/HVA are added, in the IaaS environment according to this embodiment of the present invention. The trace data 565 contains access time (Time), a command (Command), a HPA, a HVA/GPA, a GVA, a process ID (PID), and a process name (Process Name). Note that items of the HVA/GPA and the GVA are added by the filters 550 and 560, respectively.

Figure 6:
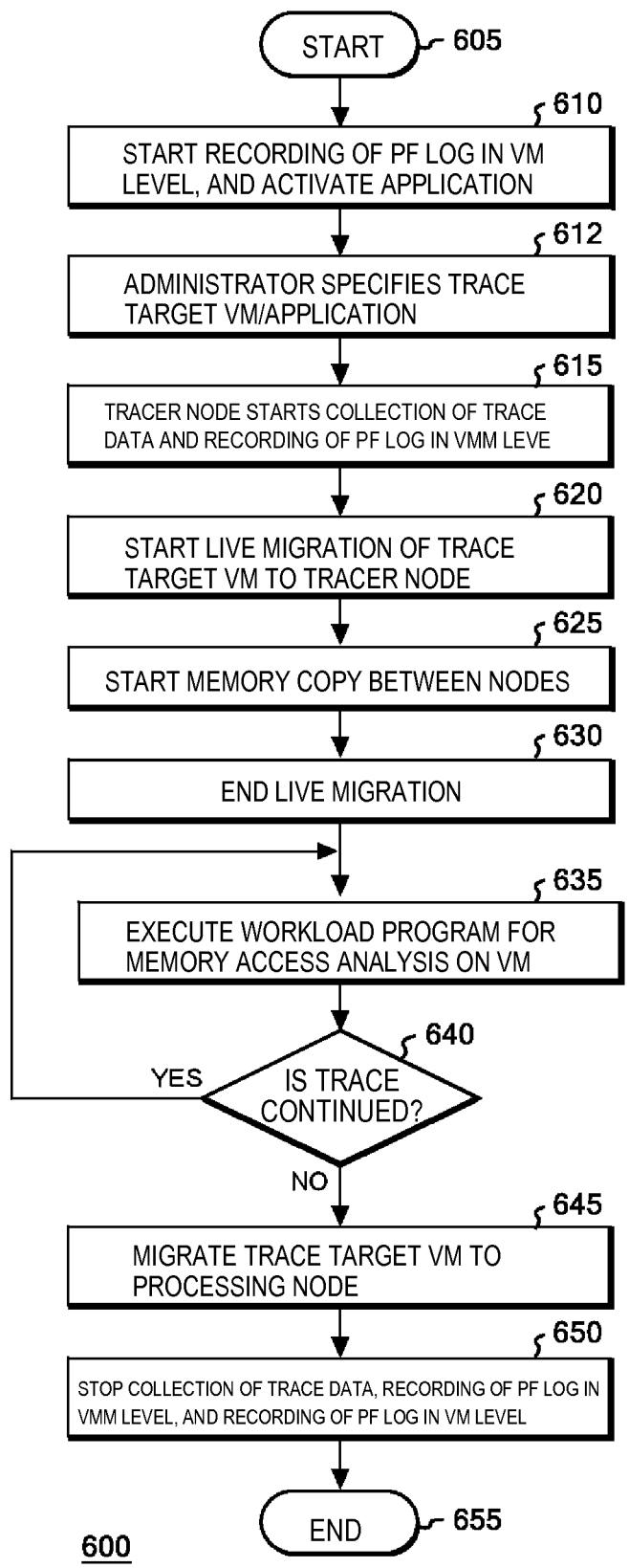
FIG. 6 is a first flow chart expressing an operation of a trace process of a particular VM and/or a particular application program in the IaaS environment according to an embodiment of the present invention.

FIG. 6 is a first flow chart 600 expressing an operation of a trace process of a particular VM and/or a particular application program in the IaaS environment according to this embodiment of the present invention. In the flow chart 600, a process of collecting raw trace data and a page fault log is executed.

In Step 605, the process is started. In Step 610, recording of the PF log in the VM level is started on the VMs running on a given processing node 120 and application programs are activated. The PF log 535 in the VM level has already been described with reference to the example illustrated in FIG. 8 and, hence, further detailed description thereof is not given here.

Subsequently, in Step 612, the administrator 140 specifies a trace target VM and/or a trace target application program running on the given processing node. The process proceeds to Step 615 and the tracer node 130 starts to acquire a trace of memory access to its main memory and record the trace of memory access as trace data. Further, in Step 615, the tracer node 130 starts to record every access to its memory apparatus into the PF log 540 in the VMM level. The PF log 540 in the VMM level has already been described with reference to the example illustrated in FIG. 9 and, hence, further detailed description thereof is not given here. In this embodiment of the present invention, it is assumed that the collection of the trace data and the recording into the PF log 540 in the VMM level are continuously performed in a trace analysis target period.

Subsequently, in Step 620, the specified VM or the VM on which the specified application program is running starts to be live-migrated from the given processing node 120 to the tracer node 130.

The process proceeds to Step 625. In response to the occurrence of the live migration to the tracer node 130 in Step 620, the contents of the memory that is used by the live migration target VM on the migration-origin node are copied (herein, can be simply referred to as "memory copy") to the migration-destination node. Specifically, in order for the tracer node 130 to copy the contents of the memory that is used by the VM on the server before the migration to the server after the migration, the VMM on the migration-origin processing node and the migration-destination tracer node exchange data with each other. At this time, writing into the memory apparatus of the tracer node is tried with the HVA of the tracer node being specified, but the HPA corresponding to the HVA is yet to be decided so that a page fault occurs. In this embodiment of the present invention, the PF log 540 in the VMM level is updated so as to include information of: the correspondence between the HPA assigned in response to the occurring PF in the VMM level and the HVA; and the assignment time.

In this embodiment of the present invention, a PF occurs over the entire storage area as the memory copy target and, hence, the PF log 540 is updated for the entire memory region used by the live migration target VM. Note that, in this embodiment of the present invention, because the VMM 415 can control the memory copy and can identify the start and end of the memory copy, a PF that occurs for the live-migrated VM from the start of the memory copy to the end thereof can be identified.

Moreover, the process proceeds to Step 630. The live migration is ended, and the user receives an IT infrastructure service from the VM running on the tracer node 130 thereafter. Note that, in this embodiment of the present invention, the PF log 535 in the VM level whose recording is started in Step 612 is migrated to the tracer node 130 together with the trace target VM, as a result of performing the live migration. Further, in this embodiment of the present invention, at the time of performing the memory copy in Step 625, a PF can occur as a result of trying the memory access by the application program running on the VM. In this embodiment of the present invention, the PF log 535 in the VM level is updated so as to include information of: the correspondence between the GPA assigned in response to such a PF and the GVA; and the assignment time.

Next, in Step 635, a workload program for memory access analysis to be performed later is executed on the VM live-migrated to the tracer server 130. Every memory access during the workload program execution is stored as trace data. Further, in the case where a PF in the VM level or a PF in the VMM level occurs during the workload program execution, the PF is stored into the PF log 535 in the VM level or the PF log 540 in the VMM level, as a matter of course. In Step 640, moreover, it is determined whether or not the trace of the access to the memory apparatus of the tracer node 130 is continued. If it is determined that the trace is continued, the process returns to Step 635 through an arrow of YES and this routine is repeated until the trace is stopped.

If it is determined in Step 640 that the trace is not continued, the process proceeds to Step 645 through an arrow of NO and the trace target VM is migrated to an arbitrary processing node. If the VM whose trace is completed is live-migrated to the arbitrary processing node in this way, resources of the tracer node 130 can be effectively utilized. Subsequently, the process proceeds to Step 650 and the collection of the trace data, the recording of the PF log in the VMM level, and the recording of the PF log in the VM level are stopped. In Step 655, the process of the flow chart 600 is ended.

Figure 7:
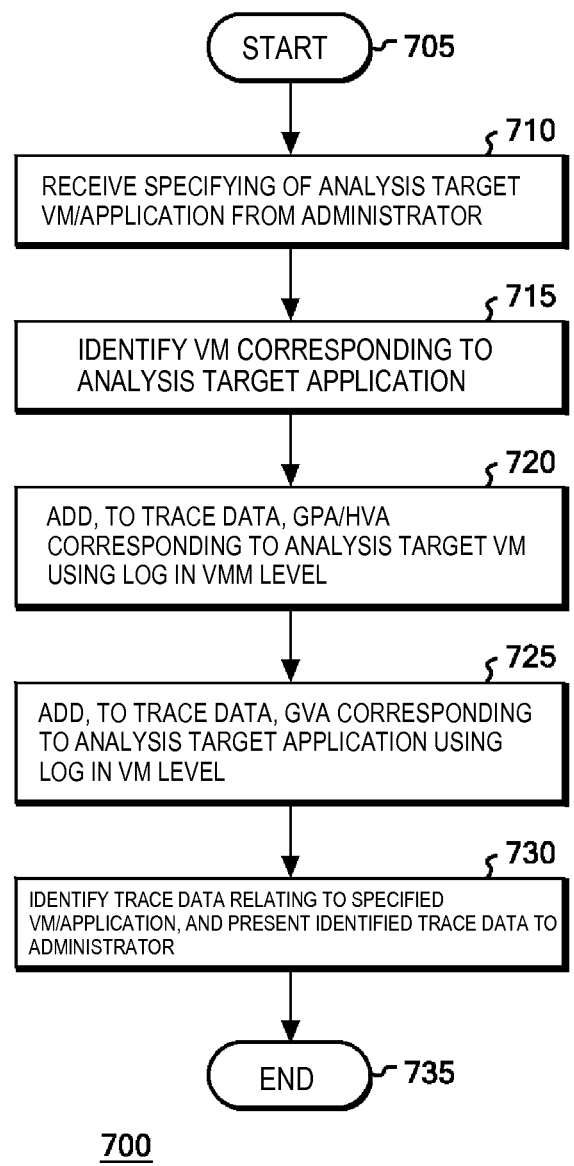
FIG. 7 is a second flow chart expressing the operation of the trace process of the particular VM and/or the particular application program in the IaaS environment according to an embodiment of the present invention.

FIG. 7 is a second flow chart 700 expressing the operation of the trace process of the particular VM and/or the particular application program in the IaaS environment according to this embodiment of the present invention. In the flow chart 700, a process of identifying, for each VM/application program, trace data using the raw trace data and the PF log collected in the process of the flow chart 600 is executed. Note that it is assumed that the trace data is migrated to the trace data storing apparatus 135 before the execution of the flow chart 700. The migration of the trace data to the trace data storing apparatus 135 has already been described in relation to FIG. 3 and, hence, further detailed description thereof is not given here.

In Step 705, the process is started. In Step 710, the administrator 140 specifies an analysis target VM and/or an analysis target application program. The process proceeds to Step 715. In the case where an application program is specified in Step 710, the VM on which the application program is running is identified.

Next, in Step 720, trace data of the analysis target VM is identified using the PF log 540 in the VMM level. Specifically, with reference to the PF log 540 in the VMM level, the filter 550 retrieves memory access including the HPA corresponding to the HVA/GPA of the analysis target VM at a given time, the memory access being included in the raw trace data. Then, the filter 550 adds, to this memory access, information of the HVA/GPA corresponding to the HPA at the access time and forms the trace data 555 to which the HVA/GPA is added.

The process proceeds to Step 725 and trace data of the analysis target application program is identified using the PF log 535 in the VM level. Specifically, the filter 560 retrieves memory access including the GPA/HVA (which is added in Step 720) corresponding to the GVA assigned to the analysis target application at a given time, the memory access being recorded in the PF log 535 in the VM level. Then, the filter 560 adds, to this memory access, information of the HVA/GPA corresponding to the HPA at the access time and forms the trace data 565 to which the HVA/GPA is added.

A person skilled in the art will easily understand that, because the information of the HVA/GPA of the analysis target VM and/or the GVA of the analysis target application is added to the memory access included in the trace data in Steps 720 and 725, the memory access becomes identifiable as the trace data of the analysis target VM/application program.

The process proceeds to Step 730. On the basis of items of the HVA/GPA and the GVA added to the trace data, only portions about the analysis target VM and/or the analysis target application program that are specified by the administrator in Step 710 are presented to the administrator. As a result, the administrator can analyze memory access of the VM and/or the application program (for example, memory access patterns of various workloads) specified as his/her analysis target. Subsequently, the process proceeds to Step 735 and the process of the flow chart 700 is ended.

As is easily understood by a person skilled in the art, the present invention can be carried out as a system, method, or computer program product. Hence, the present invention can be in the form of: an embodiment fully as hardware; an embodiment fully as software (including firmware, resident software, and microcode); or an embodiment that is obtained by combining software and hardware and is generally referred to as "circuit", "module", or "system". Moreover, the present invention can also be in the form of a computer program product that is implemented by a tangible medium having program codes that are implemented by the medium and usable by a computer.

A combination of computer-usable/computer-readable media can also be used. The computer-usable/computer-readable medium can be, for example, an electronic, magnetic, optical, electromagnetic, infrared, or semiconductor system, apparatus, device, or propagation medium, but is not limited thereto. A non-comprehensive list of a more specific example of the computer-readable medium includes: electrical connection having a conductive wire; a portable computer diskette; a hard disk; a random access memory (RAM); a read only memory (ROM); an erasable programmable read only memory (EPROM or a flash memory); an optical fiber; a portable compact disc read only memory (CD-ROM); an optical memory device; a transmission medium that supports the Internet or an intranet; and a magnetic storing apparatus.

A program is electronically acquired by, for example, optically scanning paper or other media. Then, the program is compiled, interpreted, and processed according to other appropriate methods and stored into a memory of the computer as needed. Hence, it can be noted that the computer-usable/computer-readable medium can be paper on which the program is printed or other appropriate media. The computer-usable/computer-readable medium can be an arbitrary medium that can contain, store, communicate, propagate, or transport the program to be used by a command executing system, apparatus, or device or in relation thereto. The medium usable by the computer can include, as part of baseband or carrier signals, propagated data signals including program codes that are implemented together and usable by the computer. The program codes usable by the computer can be transmitted using an appropriate medium that can be wireless, wired, an optical fiber cable, RF, or the like, but is not limited thereto.

Computer program codes for carrying out the present invention can be written using a combination of one or more programming languages including: object-oriented programming languages such as Java, Smalltalk, and C++; and conventional procedural programming languages such as C programming languages and programming languages similar thereto. The program codes can be executed: fully on the computer of the user; partially on the computer of the user; partially on the computer of the user and partially on the remote computer, as an independent software package; and fully on the remote computer or the server. In the latter scenario, the remote computer can be connected to the computer of the user through an arbitrary type of a network including a local area network (LAN) and a wide area network (WAN) and the connection can be made to an external computer (for example, through the Internet using an Internet service provider).

Hereinabove, this embodiment of the present invention is described with reference to the flow charts and/or the block diagrams of the method, apparatus (system), and computer program product. It is understood that each block in the flow charts and/or the block diagrams and a combination of the blocks in the flow charts and/or the block diagrams can be executed by computer program commands. In order for commands executed by a general-purpose computer, a special-purpose computer, or processors of other programmable data processing apparatuses to manufacture a machine that generates means for executing a function/action specified by one or more blocks in the flow charts and/or the block diagrams, the computer program commands can be given to the computers or processors of other programmable data processing apparatuses.

The computer program commands can also be stored in a computer-readable medium that enables the computers or other programmable data processing apparatuses to function in a particular mode such that the commands stored in the computer-readable medium manufacture a product including command means for executing the function/action specified by one or more blocks in the flow charts and/or the block diagrams.

In order to create a process executed by the computer such that the commands executed by the computers or other programmable data processing apparatuses provide a process for executing the function/action specified by one or more blocks in the flow charts and/or the block diagrams, the computer program commands can also be loaded onto the computers or other programmable data processing apparatuses such that a series of operation steps are executed on the computers or other programmable data processing apparatuses.

The flow charts and the block diagrams in the drawings each illustrate the architecture, functionality, and execution operations of the system, method, and computer program product according to various embodiments of the present invention. In this regard, each block in the flow charts or the block diagrams can represent a module, segment, or code portion including one or more executable commands for executing a specified logical function. Note that, in some alternative embodiments, the functions shown in the blocks can be performed in order different from that in the drawings. For example, in accordance with related functionality, two blocks shown in order can be actually executed substantially at the same time or can be executed in the opposite order. Each block in the block diagrams and/or the flow charts and a combination of the blocks in the block diagrams and/or the flow charts can be executed by a special-purpose hardware-centric system that performs a special function or action or by a combination of special-purpose hardware.

Hereinabove, it is understood that, according to this embodiment of the present invention, in the IaaS environment, trace data relating to a particular virtual machine is identified from trace data acquired by the tracer node. Moreover, it is understood that, according to this embodiment of the present invention, because a small number of tracer nodes can be effectively utilized, a trace of access to the memory apparatus of a particular virtual machine can be acquired at lower costs.

It is obvious for a person skilled in the art that the above-mentioned embodiment can be variously changed or improved. For example, in this embodiment of the present invention, description is given on the premise that the administrator specifies for analysis the trace target VM and/or the trace target application program, but, as a matter of course, the user who uses each VM via the network can take a role as the administrator of this embodiment of the present invention in order to analyze memory access of his/her VM and/or application program. Such a modification can be naturally included in a range of a technical idea of the present invention.

I claim:

1. A computer-implemented method for identifying trace data related to a particular virtual machine from trace data acquired by a tracer node, wherein the computer includes at least one processing node and a tracer node for acquiring a trace of access to a memory apparatus thereof, the method comprising the steps of:

recording a first page fault log, by a given processing node that is hosting the particular virtual machine, wherein the first page fault log includes a mapping between guest virtual addresses and guest physical addresses;

starting, by the tracer node, to record a trace data containing information of the trace of the access to the memory apparatus of the tracer node;

migrating, by the tracer node, the particular virtual machine from the given processing node to the tracer node, wherein the migrating comprises:

copying, by an hypervisor of the tracer node, entire memory contents of the particular virtual machine from the given processing node to the memory apparatus of the tracer node, which results in a single page fault at the hypervisor of the tracer node;

assigning a physical address of the memory apparatus of the tracer node to copy the entire memory contents of the particular virtual machine, in response to the page fault;

storing, by the hypervisor, in a second page fault log corresponding to the hypervisor, information identifying the physical address of the memory apparatus of the tracer node at which the entire contents are copied in response to the migration of the particular virtual machine from a given processing node to the tracer node, the physical address being assigned to the particular virtual machine, and wherein the second page fault log includes a mapping between guest physical addresses and physical addresses of the memory apparatus of the tracer node; and copying, by the hypervisor of the tracer node, the first page fault log to the memory apparatus of the tracer node concurrently with the particular virtual machine;

adding, by the tracer node, in an entry of the trace data, a first correspondence information between the guest physical address and the physical address of the memory apparatus that the entry is for, wherein the first correspondence information is obtained from the second page fault log;

adding, by the tracer node, in the entry of the trace data, a second correspondence information between the guest virtual address and the guest physical address corresponding to the physical address of the memory apparatus that the entry is for, wherein the second correspondence information is obtained from the first page fault log; and identifying the trace data relating to the particular virtual machine from the trace data, using the assigned physical address of the memory apparatus of the tracer node.

2. The computer-implemented method according to claim 1, wherein the at least one processing node and the tracer node each include a hypervisor capable of managing at least one virtual machine.

3. The computer-implemented method according to claim 2, wherein the virtual machine executes a first address translation between a guest virtual address and a guest physical address.

4. The computer-implemented method according to claim 3, wherein the information identifying the physical address of the memory apparatus of the tracer node is a host physical address, and the hypervisor executes a second address translation between a host virtual address and a host physical address.

5. The computer-implemented method according to claim 4, wherein the host virtual address and the guest physical address are equivalent to each other.

6. The computer-implemented method according to claim 5, wherein the step of storing includes a step of storing a host physical address that is assigned to the particular virtual machine in response to a page fault that occurs due to the second translation.

7. The computer-implemented method according to claim 6, further comprising a step of starting memory copy in response to the migration, wherein the page fault due to the second translation occurs for every host virtual address that is used for the memory copy by the particular virtual machine.

8. The computer-implemented method according to claim 6, wherein the hypervisor is capable of controlling memory copy and identifying start and end of the memory copy.

9. The computer-implemented method according to claim 6, wherein the trace data contains an access time associated with each access to the memory apparatus, the step of storing includes a step of storing, into the first page fault log, a correspondence between the host virtual address and the host physical address and occurrence time of the page fault due to the second translation, and the step of identifying includes a step of adding, to each memory access in the trace data, information of the host virtual address that is assigned to the particular virtual machine at the access time with reference to the page fault log.

10. The computer-implemented method according to claim 9, wherein the step of identifying includes identifying the trace data relating to the particular virtual machine from the trace data on a basis of the added information of the host virtual address.

11. The computer-implemented method according to claim 10, further comprising a step of identifying, as a trace target, an application program product running on the particular virtual machine, wherein the step of storing includes a step of storing a guest physical address that is assigned to the application program product identified as the trace target, in response to a page fault that occurs due to the first translation.

12. The computer-implemented method according to claim 11, wherein the step of adding includes a step of storing, into the second page fault log, a correspondence between the host virtual address and the host physical address and occurrence time of the page fault due to the first translation, and the step of identifying includes a step of adding, to each memory access in the trace data, information of the guest virtual address that is assigned to the application program product identified as the trace target at the access time, with reference to the page fault log.

13. The computer-implemented method according to claim 12, wherein the step of identifying includes identifying trace data relating to the application program product identified as the trace target from the trace data, on a basis of the added information of the guest virtual address.

14. A non-transitory computer readable storage medium tangibly embodying a computer readable program code having computer readable instructions which, when implemented, cause a computer device to carry out the steps of a method for identifying trace data related to a particular virtual machine from trace data acquired by a tracer node, the method comprising:

recording a first page fault log, by a given processing node that is hosting the particular virtual machine, wherein the first page fault log includes a mapping between guest virtual addresses and guest physical addresses;

starting, by the tracer node, to record a trace data containing information of a trace of access to a memory apparatus of the tracer node;

migrating, by the tracer node, the particular virtual machine from the given processing node to the tracer node, wherein the migrating comprises:

copying, by an hypervisor of the tracer node, entire memory contents of the particular virtual machine from the given processing node to the memory apparatus of the tracer node, which results in a single page fault at the hypervisor of the tracer node;

assigning a physical address of the memory apparatus of the tracer node to copy the entire memory contents of the particular virtual machine, in response to the page fault;

storing, by the hypervisor, in a second page fault log corresponding to the hypervisor, information identifying the physical address of the memory apparatus of the tracer node at which the entire contents are copied in response to the migration of the particular virtual machine from a given processing node to the tracer node, the physical address being assigned to the particular virtual machine, and wherein the second page fault log includes a mapping between guest physical addresses and physical addresses of the memory apparatus of the tracer node; and copying, by the hypervisor of the tracer node, the first page fault log to the memory apparatus of the tracer node concurrently with the particular virtual machine;

adding, by the tracer node, in an entry of the trace data, a first correspondence information between the guest physical address and the physical address of the memory apparatus that the entry is for, wherein the first correspondence information is obtained from the second page fault log;

adding, by the tracer node, in the entry of the trace data, a second correspondence information between the guest virtual address and the guest physical address corresponding to the physical address of the memory apparatus that the entry is for, wherein the second correspondence information is obtained from the first page fault log; and identifying the trace data relating to the particular virtual machine from the trace data, using the assigned physical address of the memory apparatus of the tracer node.

15. The computer readable storage medium according to claim 14, wherein the given processing node and the tracer node each include a hypervisor capable of managing at least one virtual machine.

16. The computer readable storage medium according to claim 15, wherein the virtual machine executes a first address translation between a guest virtual address and a guest physical address.

17. The computer readable storage medium according to claim 16, wherein the information identifying the physical address of the memory apparatus of the tracer node is a host physical address, and the hypervisor executes a second address translation between a host virtual address and a host physical address.

18. A tracer node system for identifying trace data related to a particular virtual machine from trace data acquired by a tracer node, the tracer node system comprising:

a memory;

a processor communicatively coupled to the memory; and a tracer node module communicatively coupled to the memory and the processor, wherein the tracer node module is configured to perform steps of a method comprising:

recording a first page fault log, by a given processing node that is hosting the particular virtual machine, wherein the first page fault log includes a mapping between guest virtual addresses and guest physical addresses;

starting, by the tracer node, to record a trace data containing information of a trace of access to a memory apparatus of the tracer node;

migrating, by the tracer node, the particular virtual machine from the given processing node to the tracer node, wherein the migrating comprises:

copying, by an hypervisor of the tracer node, entire memory contents of the particular virtual machine from the given processing node to the memory apparatus of the tracer node, which results in a single page fault at the hypervisor of the tracer node;

assigning a physical address of the memory apparatus of the tracer node to copy the entire memory contents of the particular virtual machine, in response to the page fault;

storing, by the hypervisor, in a second page fault log corresponding to the hypervisor, information identifying the physical address of the memory apparatus of the tracer node at which the entire contents are copied in response to the migration of the particular virtual machine from a given processing node to the tracer node, the physical address being assigned to the particular virtual machine, and wherein the second page fault log includes a mapping between guest physical addresses and physical addresses of the memory apparatus of the tracer node; and copying, by the hypervisor of the tracer node, the first page fault log to the memory apparatus of the tracer node concurrently with the particular virtual machine;

adding, by the tracer node, in an entry of the trace data, a first correspondence information between the guest physical address and the physical address of the memory apparatus that the entry is for, wherein the first correspondence information is obtained from the second page fault log;

adding, by the tracer node, in the entry of the trace data, a second correspondence information between the guest virtual address and the guest physical address corresponding to the physical address of the memory apparatus that the entry is for, wherein the second correspondence information is obtained from the first page fault log; and identifying the trace data relating to the particular virtual machine from the trace data, using the assigned physical address of the memory apparatus of the tracer node.

19. The tracer node system according to claim 18, wherein the given processing node and the tracer node each include a hypervisor capable of managing at least one virtual machine.

20. The tracer node system according to claim 19, wherein the virtual machine executes a first address translation between a guest virtual address and a guest physical address.

\* \* \* \* \*